United States Patent
Yang (10) Patent No.: US 9,201,451 B2
(45) Date of Patent: Dec. 1, 2015

(54) HOLDING STRUCTURE

(71) Applicant: Wistron Corporation, New Taipei (TW)

(72) Inventor: Hung-Sen Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 203 days.

(21) Appl. No.: 14/151,838

(22) Filed: Jan. 10, 2014

(65) Prior Publication Data

US 2015/0137761 A1 May 21, 2015

(30) Foreign Application Priority Data

Nov. 20, 2013 (TW) .............................. 102221738 U (51) Int. Cl.
*H02J 7/00* (2006.01)
*G06F 1/16* (2006.01)
*F16M 11/04* (2006.01)
*F16M 13/02* (2006.01)

(52) U.S. Cl.
CPC ............... *G06F 1/16* (2013.01); *F16M 11/041* (2013.01); *F16M 13/022* (2013.01); *H02J 7/0044* (2013.01)

(58) Field of Classification Search
CPC ..................................................... H02J 7/0044
USPC ......................................................... 320/115
See application file for complete search history.

(56) References Cited

U.S. PATENT DOCUMENTS

| 7,828,259 B2* | 11/2010 | Wang | B60R 11/02 245/316.4 |
| 2010/0315041 A1* | 12/2010 | Tan | H02J 7/0044 320/115 |
| 2012/0229300 A1* | 9/2012 | Fu | B60R 11/02 340/901 |
| 2014/0091192 A1* | 4/2014 | Mersky | F16M 11/041 248/447 |
| 2014/0125283 A1* | 5/2014 | Yang | H02J 7/0044 320/115 |
| 2014/0265185 A1* | 9/2014 | Mersky | B62B 3/1428 280/33.992 |
| 2015/0137760 A1* | 5/2015 | Yang | F16M 11/041 320/115 |

* cited by examiner

*Primary Examiner* — M'Baye Diao
(74) *Attorney, Agent, or Firm* — Jianq Chyun IP Office (57) ABSTRACT

A holding structure adapted to an electronic device is provided. The holding structure includes a base, at least one positioning assembly and a position-limiting component. The positioning assembly is disposed on the base. The position-limiting component is pivoted to the base. When the electronic device is placed on the base, the position-limiting component is pushed by the electronic device to move to a second position from a first position. When the position-limiting component is located at the second position, the positioning assembly positions the position-limiting component and the position-limiting component limits the electronic device at the base.

10 Claims, 8 Drawing Sheets

HOLDING STRUCTURE

CROSS-REFERENCE TO RELATED APPLICATION

This application claims the priority benefit of Taiwan application serial no. 102221738, filed on Nov. 20, 2013. The entirety of the above-mentioned patent application is hereby incorporated by reference herein and made a part of this specification.

BACKGROUND

1. Field of the Invention

The invention is directed to a holding structure and more particularly, to a holding structure for holding an electronic device.

2. Description of Related Art

In this modern information explosion era, electronic products have developed an indispensable relationship with our everyday life. Along with continual development of electronic technology, user-friendly handheld electronic products with powerful functions, such as tablet PCs and smart phones have come forth and gradually replaced old electronic products, which have gradually become indispensable tools in daily life due to the convenience and portability.

In order to allow a user to conveniently use a handheld electronic device while driving, a car charger holder can be equipped in the car for holding and charging the handheld electronic device. However, under the designs of the currently available car charger holders, a user has to use both hands to either mount the handheld electronic device to a car charger holder and to take away the handheld electronic device from the car charger holder, which leads to risks of driving safety and increased traffic accidents.

SUMMARY

The invention is directed to a holding structure that is convenient for a user to mount an electronic device to the holding structure with one hand.

The invention is directed to a holding structure adapted to an electronic device. The holding structure includes a base, at least one positioning assembly and a position-limiting component. The at least one positioning assembly is disposed on the base. The position-limiting component is pivoted to the base. When the electronic device is placed on the base, the position-limiting component is pushed by the electronic device to move to a second position from a first position. When the position-limiting component is located at the second position, the at least one positioning assembly positions the position-limiting component, and the position-limiting component limits the electronic device at the base.

In an embodiment of the invention, when the at least one positioning assembly receives a force to release the position-limiting component, the position-limiting component is adapted to move to the first position from the second position and push the electronic device away from the base.

In an embodiment of the invention, the base includes a main body and a first elastic component. The at least one positioning assembly is disposed on the main body, and the position-limiting component is pivoted to the main body. The first elastic component is connected between the main body and the position-limiting component. The position-limiting component is adapted to move toward the first position by an elastic force of the first elastic component. When the electronic device is placed on the main body, the electronic device resists the elastic force of the first elastic component to push the position-limiting component to the second position from the first position, and the at least one positioning assembly resists the elastic force of the first elastic component to position the position-limiting component at the second position.

In an embodiment of the invention, the position-limiting component has at least one extension arm and adapted to push the electronic device away from the base by the at least one extension arm. The electronic device is adapted to push the at least one extension arm to move the position-limiting component to the second position from the first position. When the position-limiting component is located at the second position, the at least one positioning assembly positions the at least one extension arm.

In an embodiment of the invention, a number of the at least one positioning assembly is two, a number of the at least one extension arm is two, and the two extension arms are respectively aligned to the two positioning assemblies.

In an embodiment of the invention, one of the two positioning assemblies is adapted to receive a force along a first direction to release the corresponding extension arm, and the other of the two positioning assemblies is adapted to receive a force along a second direction which is opposite to the first direction to release the corresponding extension arm.

In an embodiment of the invention, the at least one positioning assembly includes a positioning component and a second elastic component. The positioning component is movably disposed on the main body. The second elastic component is connected between the base and the positioning component. The positioning component is adapted to position the position-limiting component at the second position by an elastic force of the second elastic component.

In an embodiment of the invention, the position-limiting component has a first engagement part, and the positioning component has a second engagement part, a pivoting part and a pressing part. The pivoting part is connected between the second engagement part and the pressing part and pivoted to the base. The second elastic component is connected between the positioning component and the main body. The second engagement part is adapted to be engaged with the first engagement part by the elastic force of the second elastic component. The pressing part is adapted to receive a force and resist the elastic force of the second elastic component to drive the pivoting part to pivot relatively to the base, such that the second engagement part moves away from the first engagement part.

In an embodiment of the invention, the base has a containing concave electronic device, and a bottom of the electronic device is adapted to be contained in the containing concave.

In an embodiment of the invention, the base has a connection port and is adapted to be electrically connected to an external power supply. When the electronic device leans against the base, the electronic device is connected to the connection port and receives electricity from the external power supply through the connection port.

Based on the above, the holding structure of the invention has the positioning assembly disposed on the base and the position-limiting component pivoted to the base. The user can place the electronic device on the base, such that the electronic device pushes the position-limiting component to pivot. Thereby, the position-limiting component limits the electronic device on the base, and the at least one positioning assembly positions the position-limiting component. In the aforementioned operation manner, the operations of the position-limiting component and the positioning assembly are achieved by the driving of the electronic device, and in this way, the user can successfully mount the electronic device to the holding structure merely by pushing the electronic device with one hand, instead of operating with both hand, and thereby, the convenience of operating the holding structure can be improved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
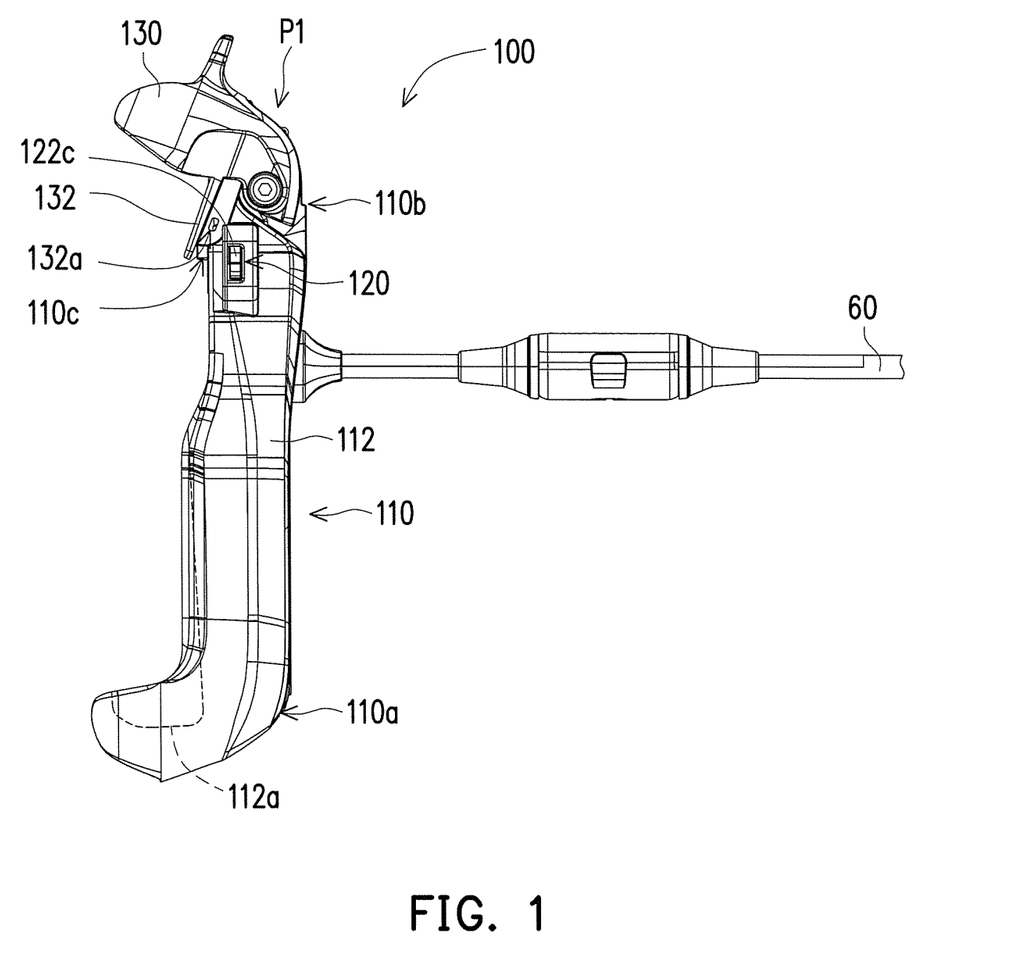
FIG. 1 is a side view of a holding structure according to an embodiment of the invention.

FIG. 1 is a side view of a holding structure according to an embodiment of the invention. With reference to FIG. 1, a holding structure 100 of the present embodiment is, for example, a car charging dock and includes a base 110, a positioning assembly 120 and a position-limiting component 130. The base 110 has a bottom portion 110a and a top portion 110b that are opposite to each other. The positioning assembly 120 is disposed on the base 110, and the position-limiting component 130 is pivoted to the top portion 110b of the base 110.

Figure 2A:
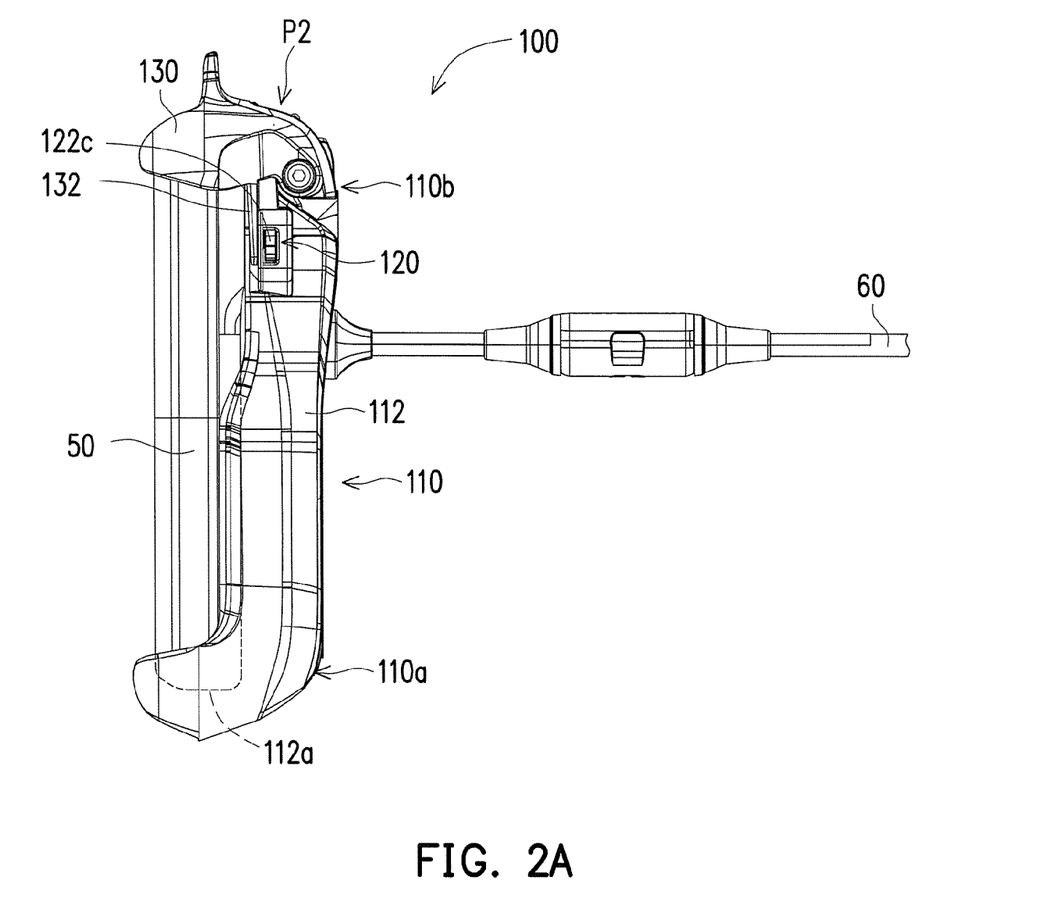
FIG. 2A and FIG. 2B are operational flowcharts of the holding structure illustrated in FIG. 1.
Figure 2B:
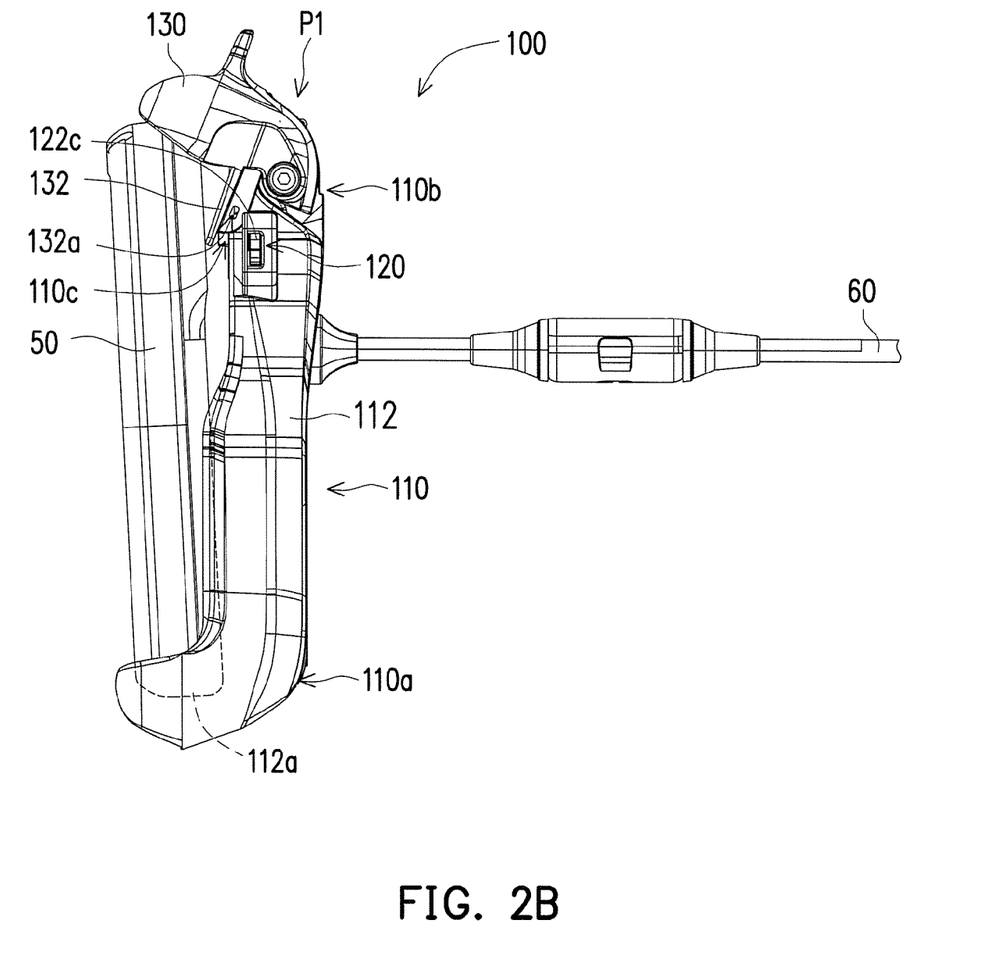

FIG. 2A and FIG. 2B are operational flowcharts of the holding structure illustrated in FIG. 1. Referring to FIG. 2A, a user may place an electronic device 50, e.g., a smart phone, on the base 110 and have the bottom portion 110a of the base 110 carry the electronic device 50. At this time, the position-limiting component 130 is pushed by the electronic device 50 to move from a first position P1 illustrated in FIG. 1 to a second position P2 illustrated in FIG. 2A. When the position-limiting component 130 is located at the second position P2, the positioning assembly 120 positions the position-limiting component 130, and the position-limiting component 130 limits the electronic device 50 on the base 110.

When wanting to take away the electronic device 50 illustrated in FIG. 2A from the holding structure 100, the user may apply a force to the positioning assembly 120, such that the position-limiting component 130 is released by the positioning assembly 120. In this case, the position-limiting component 130 is adapted to move from the second position P2 illustrated in FIG. 2A to the first position P1 illustrated in FIG. 2B and push the electronic device 50 away from the base 110, such that the user may take away the electronic device 50 from the base 110.

During the operation process illustrated in FIG. 1 through FIG. 2A, the position-limiting component 130 and the positioning assembly 120 are operated by being driven by the electronic device 50, the user may mount the electronic device 50 to the holding structure 100 successfully by placing the electronic device 50 with only one hand. Additionally, during the operation process illustrated in FIG. 2A through FIG. 2B, the user may have the position-limiting component 130 release the electronic device 50 by applying the force to the positioning assembly 120 with only one hand. Thereby, the user may assemble/disassemble the electronic device 50 to/from the holding structure 100 without both hands, such that the driving safety can be improved and the probability of traffic accidents can be reduced.

Figure 3:
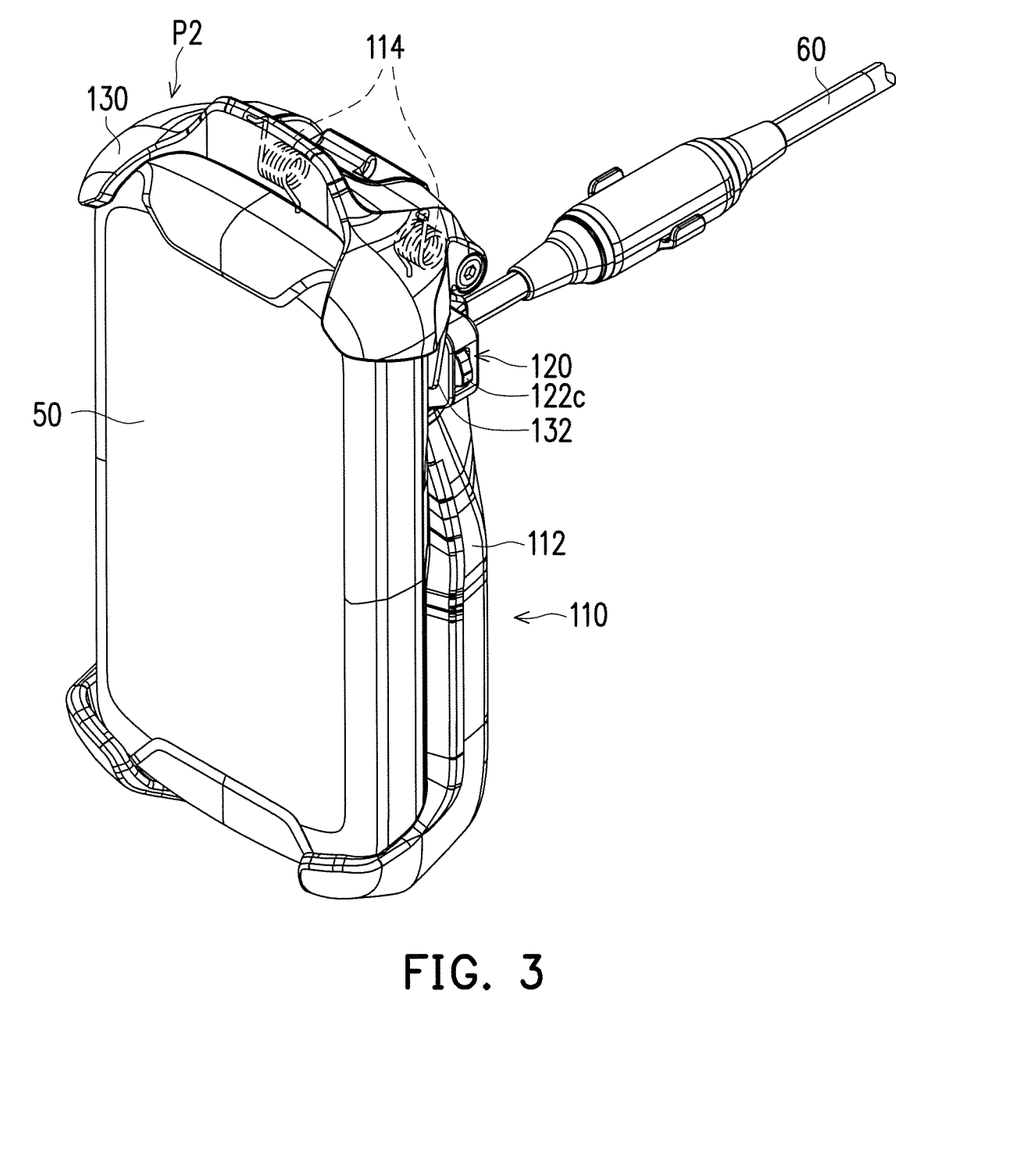
FIG. 3 is a perspective view of the holding structure and the electronic device illustrated in FIG. 2A.
Figure 4:
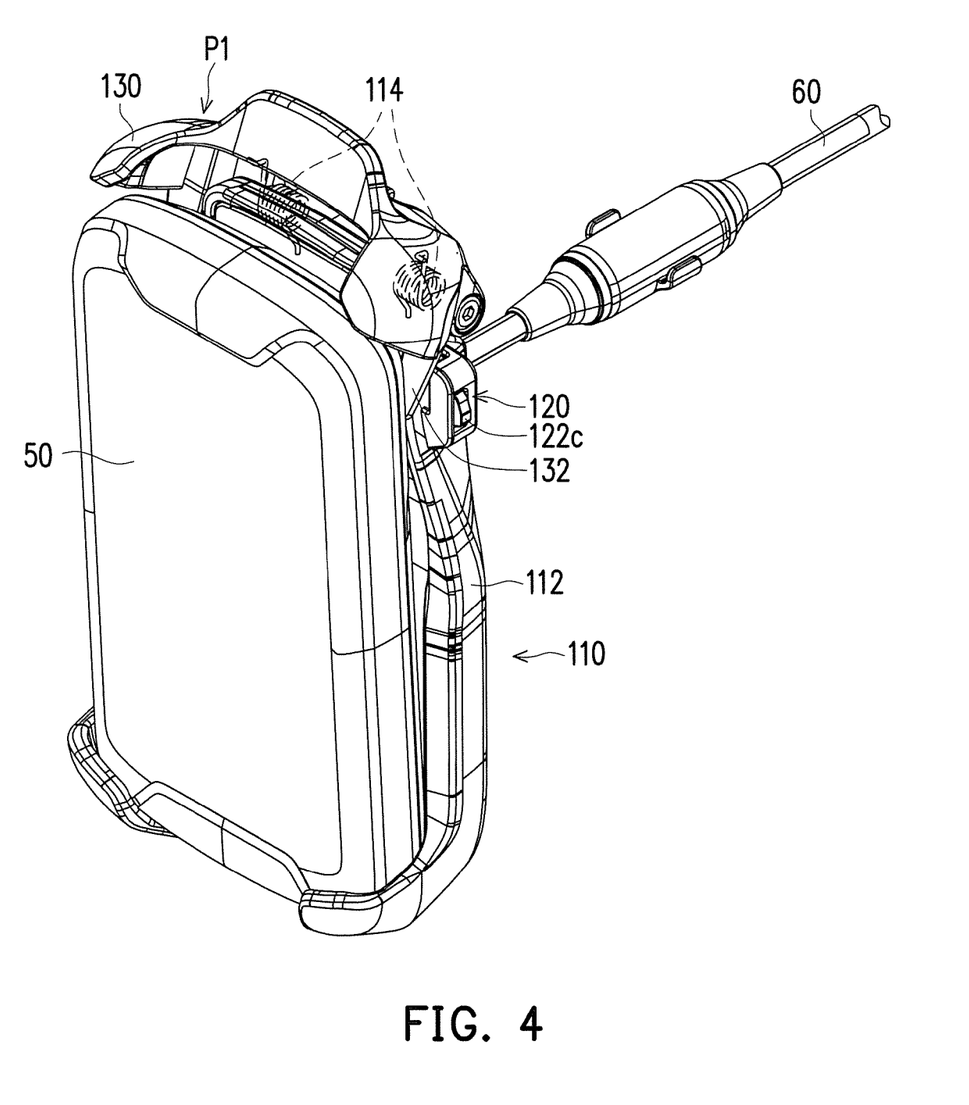
FIG. 4 is a perspective view of the holding structure and the electronic device illustrated in FIG. 2B.

FIG. 3 is a perspective view of the holding structure and the electronic device illustrated in FIG. 2A. FIG. 4 is a perspective view of the holding structure and the electronic device illustrated in FIG. 2B. With reference to FIG. 3 and FIG. 4, to be more detailed, the base 110 of the present embodiment includes a main body 112 and at least one first elastic component 114 (which is illustrated as two herein). The positioning assembly 120 is disposed on the main body 112, and the position-limiting component 130 is pivoted to the main body 112. Each first elastic component 114 is, for example, a torsion spring and connected between the main body 112 and the position-limiting component 130. The position-limiting component 130 is adapted to move toward the first position P1 illustrated in FIG. 1, FIG. 2B and FIG. 4 by an elastic force of each first elastic component 114.

When the electronic device 50 is placed on the main body 112 with the force applied by the user, the electronic device 50 resists the elastic force of each first elastic component 114 to push the position-limiting component 130 from the first position P1 to the second position P2, such that the position-limiting component 130 limits the electronic device 50 on the main body 112, and the positioning assembly 120 resists the elastic force of each first elastic component 114 to position the position-limiting component 130 at the second position P2. When the position-limiting component 130 is released by the positioning assembly 120 with the force applied by the user, the positioning assembly 120 pivots by the elastic force of each first elastic component 114 to push the electronic device 50 from the main body 112, and thereby, the user may take away the electronic device 50 from the main body 112.

With reference to FIG. 1, FIG. 2A and FIG. 2B, the main body 112 of the base 110 of the present embodiment has a containing concave 112a. The bottom of the electronic device 50 is adapted to be contained in the containing concave 112a, and thereby, the electronic device 50 is stably carried on the main body 112 of the base 110 and prevented from accidentally departing from base 110.

In the present embodiment, the holding structure 100 has a capability of charging the electronic device 50. To be more specific, with reference to FIG. 1 and FIG. 2B, the base 110 has a connection port 110c (where only the terminal of the connection port 110c is illustrated) and is adapted to be electrically connected to an external power supply (not shown) through a wire 60. When the electronic device 50 leans against the main body 112 of the base 110 as illustrated in FIG. 2A, the electronic device 50 is connected to the connection port 110c and receives electricity from the external power supply for charging through the connection port 110c.

Figure 5:
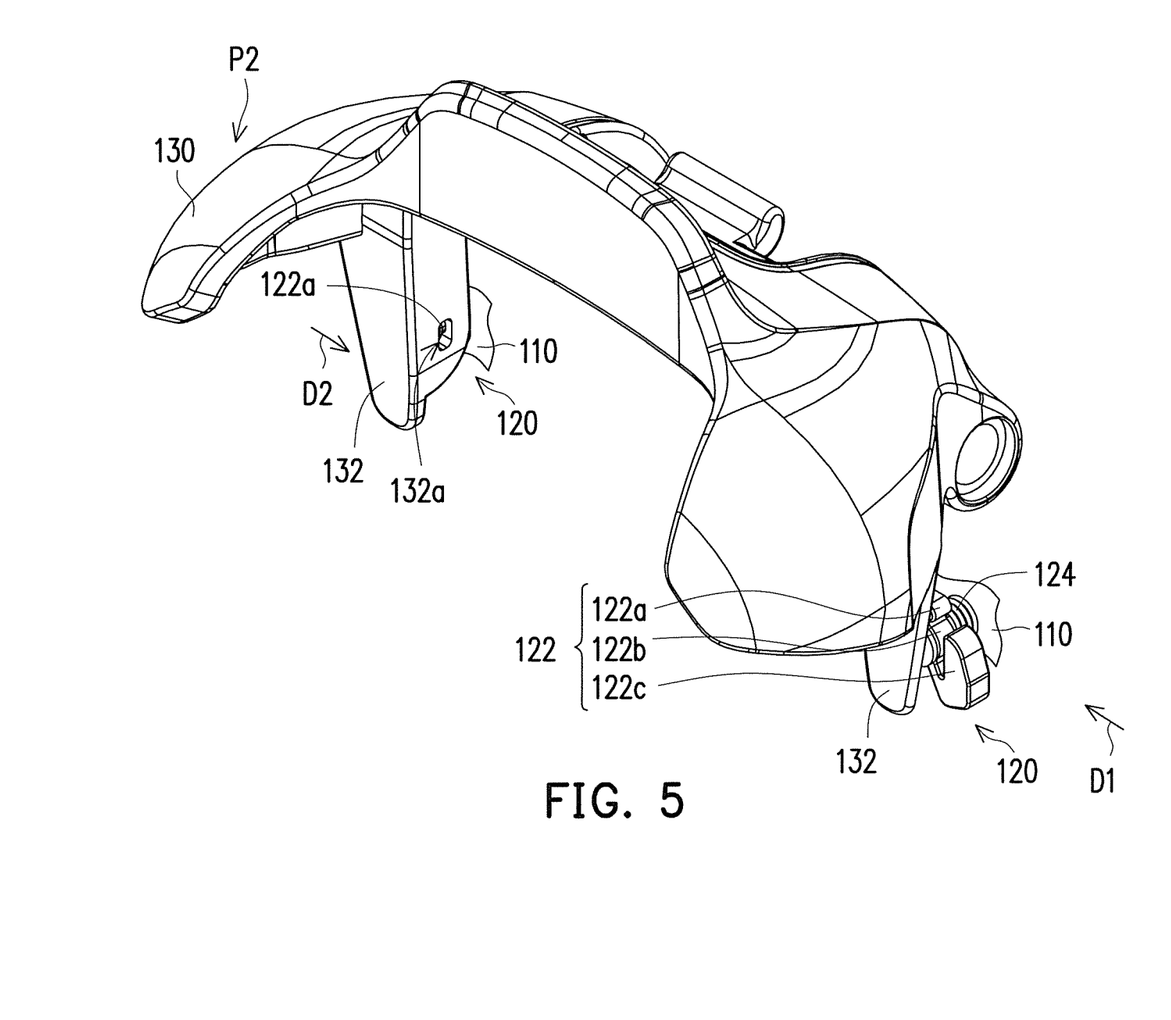
FIG. 5 is a perspective view showing a portion of the components of the holding structure illustrated in FIG. 3.
Figure 6:
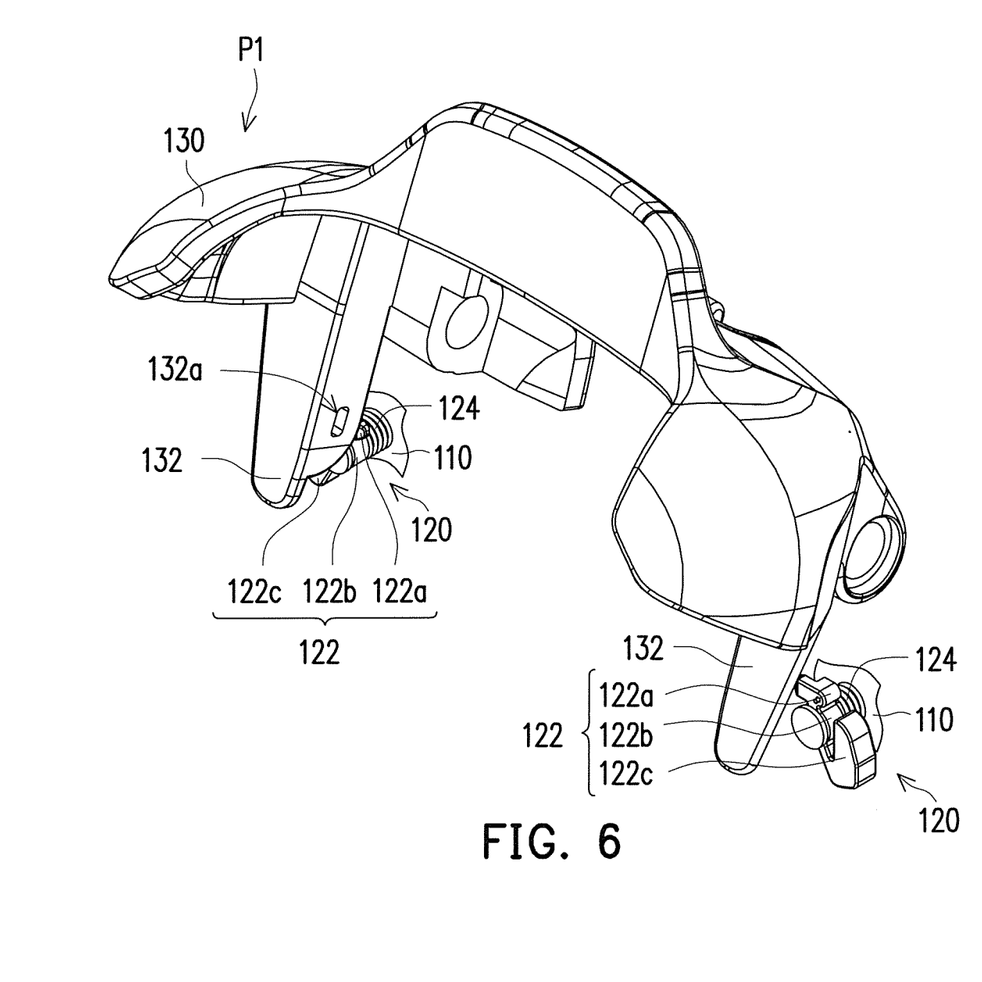
FIG. 6 is a perspective view showing a portion of the components of the holding structure illustrated in FIG. 4.

The detailed structures and operational processes of the positioning assembly 120 and the position-limiting component 130 will be described below. FIG. 5 is a perspective view showing a portion of the components of the holding structure illustrated in FIG. 3. FIG. 6 is a perspective view showing a portion of the components of the holding structure illustrated in FIG. 4. For clearer illustration, the electronic device 50 of FIG. 5 and FIG. 6 are not shown in FIG. 3 and FIG. 4, but only a portion of the base 110 is illustrated. With reference to FIG. 5 and FIG. 6, in the present embodiment, a number of the positioning assembly 120 is illustrated as two, the position-limiting component 130 has two extension arms 132, and the two extension arms 132 are respectively aligned to the two positioning assemblies 120. Referring to FIG. 2B and FIG. 4, the position-limiting component 130 is adapted to push the electronic device 50 away from the base 110 by each extension arm 132, and the electronic device 50 is adapted to push each extension arm 132, such that the position-limiting component 130 moves from the first position P1 illustrated in FIG. 2B and FIG. 4 to the second position P2 illustrated in FIG. 2A and FIG. 3. When the position-limiting component 130 is located at the second position P2, the two positioning assemblies 120 respectively position the two extension arms 132.

Figure 7:
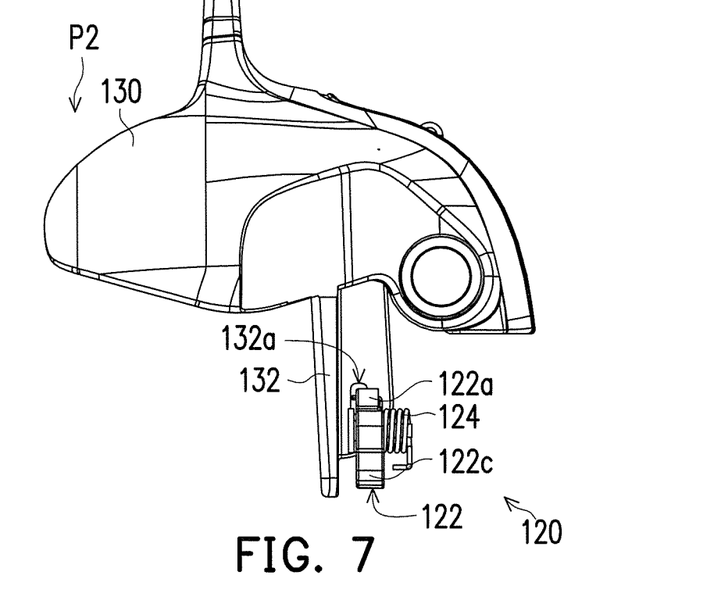
FIG. 7 is a side view of the positioning assembly and the position-limiting component illustrated in FIG. 5.
Figure 8:
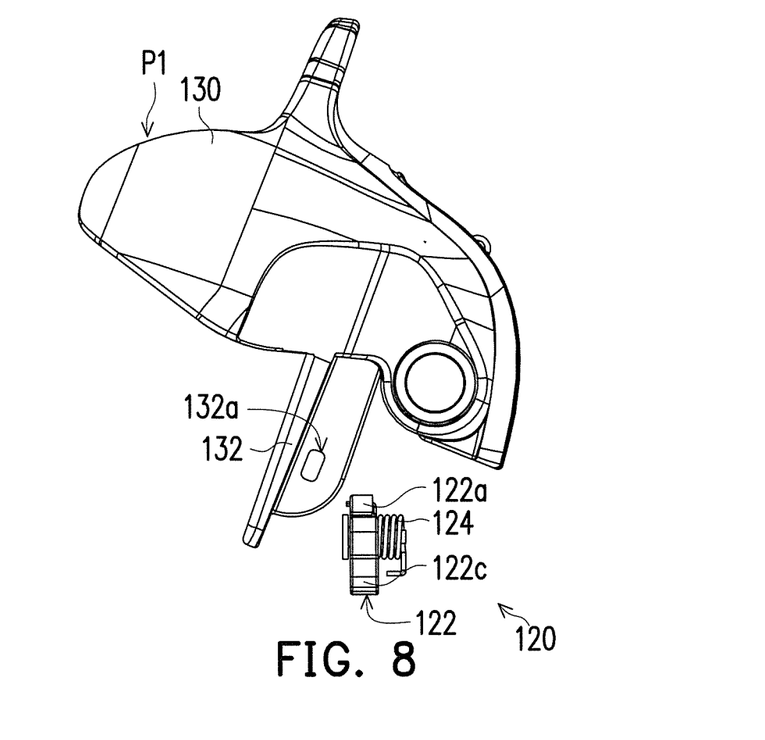
FIG. 8 is a side view of the positioning assembly and the position-limiting component illustrated in FIG. 6.

FIG. 7 is a side view of the positioning assembly and the position-limiting component illustrated in FIG. 5. FIG. 8 is a side view of the positioning assembly and the position-limiting component illustrated in FIG. 6. With reference to FIG. 5 through FIG. 8, to be more detailed, each extension arm 132 of the position-limiting component 130 of the present embodiment has a first engagement part 132a. The first engagement part 132a is, for example, an engagement slot. Each positioning assembly 120 includes a positioning component 122 and a second elastic component 1240. The positioning component 122 has a second engagement part 122a, a pivoting part 122b and a pressing part 122c. The second engagement part 122a is, for example, a protrusion structure. The pivoting part 122b is connected between the second engagement part 122a and the pressing part 122c and pivoted to the base 110, and in this way, the positioning component 122 is movably disposed on the base 110. Each second elastic component 124 is, for example, a torsion spring and connected between the base 110 and the positioning component 122.

Referring to FIG. 5 and FIG. 7, when the position-limiting component 130 is located at the second position P2, each second engagement part 122a of the positioning component 122 is engaged with the first engagement part 132a of the position-limiting component 130 by an elastic force of the second elastic component 124, such that the position-limiting component 130 is positioned at the second position P2 by the positioning component 122, and as illustrated in FIG. 2A and FIG. 3, the electronic device 50 is limited on the base 110. When wanting to take away the electronic device 50 from the base 110, the user may apply a force to the pressing part 122c of one of the two positioning assemblies along a first direction D1 (shown in FIG. 5) and apply a force to the pressing part 122c of the other of the two positioning assemblies along a second direction D2 (shown in FIG. 5) which is opposite to the first direction D1. In this case, each of the pressing parts 122c receives the force and resists the elastic force of the second elastic component 124 to drive the pivoting part 122b to pivot relatively to the base 110, such that each second engagement part 122a moves away from the corresponding first engagement part 132a and releases each of the extension arms 132 of the position-limiting component 130. When each of the extension arms is 132 is released, the position-limiting component 130 moves to the first position P1 by the elastic force of each first elastic component 124 (illustrated in FIG. 3 and FIG. 4), as shown in FIG. 6 and FIG. 8, to push the electronic device 50 away from the base 110, as shown in FIG. 2B and FIG. 4. During the aforementioned operation process, the two pressing parts 122c are adapted to respectively receive the forces along the first direction D1 and the second direction D2 that are opposite to each other to release the position-limiting component 130. By doing so, the user may conveniently press the two pressing part 122c with the forefinger and the thumb of one hand for the operation. In other embodiments, the positioning assemblies may be composed of any other suitable types of components and position the position-limiting component by any other adaptive operation manners, and the invention is not limited thereto.

In view of the foregoing, the holding structure of the invention has the positioning assembly disposed on the base and the position-limiting component pivoted to the base. The user can place the electronic device on the base, such that the electronic device pushes the position-limiting component to pivot. Thereby, the position-limiting component limits the electronic device on the base, and the at least one positioning assembly positions the position-limiting component. When wanting to take the electronic device away from the holding structure, the user can apply a force to the positioning assembly, such that position-limiting component is released by the positioning assembly to push the electronic device away from the base to allow the user to conveniently to take away the electronic device from the base. During the operation process of assembling the electronic device to the holding structure, the position-limiting component and the positioning assembly are operated by being driven by the electronic device, and thus, the user can successfully mount the electronic device to the holding structure merely by pushing the electronic device with one hand Moreover, during the operation process of disassembling the electronic device from the holding structure, the user can achieve the electronic device being released by the position-limiting component merely with one hand applying a force to the positioning assemblies. By doing so, the user can assemble/disassemble the electronic device to/from the holding structure without using both hands, such that the operational convenience of the holding structure can be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A holding structure, adapted to an electronic device, the holding structure comprising:
    a base;
    at least one positioning assembly, disposed on the base; and
    a position-limiting component, pivoted to the base, wherein when the electronic device is placed on the base, the position-limiting component is pushed by the electronic device to move to a second position from a first position, and when the position-limiting component is located at the second position, the at least one positioning assembly positions the position-limiting component and the position-limiting component limits the electronic device at the base.

2. The holding structure according to claim 1, wherein when the at least one positioning assembly receives a force to release the position-limiting component, the position-limiting component is adapted to move to the first position from the second position and push the electronic device away from the base.

3. The holding structure according to claim 1, wherein the base comprises:

a main body, wherein the at least one positioning assembly is disposed on the main body, and the position-limiting component is pivoted to the main body; and a first elastic component, connected between the main body and the position-limiting component, wherein the position-limiting component is adapted to move toward the first position by an elastic force of the first elastic component, and when the electronic device is placed on the main body, the electronic device resists the elastic force of the first elastic component to push the position-limiting component to the second position from the first position, and the at least one positioning assembly resists the elastic force of the first elastic component to position the position-limiting component at the second position.

4. The holding structure according to claim 1, wherein the position-limiting component has at least one extension arm and adapted to push the electronic device away from the base by the at least one extension arm, the electronic device is adapted to push the at least one extension such that the position-limiting component moves to the second position from the first position, and when the position-limiting component is located at the second position, the at least one positioning assembly positions the at least one extension arm.

5. The holding structure according to claim 4, wherein a number of the at least one positioning assembly is two, a number of the at least one extension arm is two, and the two extension arms are respectively aligned to the two positioning assemblies.

6. The holding structure according to claim 5, wherein one of the two positioning assemblies is adapted to receive a force along a first direction to release the corresponding extension arm, and the other of the two positioning assemblies is adapted to receive a force along a second direction which is opposite to the first direction to release the corresponding extension arm.

7. The holding structure according to claim 1, wherein the at least one positioning assembly comprises:

a positioning component, movably disposed on the main body; and a second elastic component, connected between the base and the positioning component, wherein the positioning component is adapted to position the position-limiting component at the second position by an elastic force of the second elastic component.

8. The holding structure according to claim 7, wherein the position-limiting component has a first engagement part, the positioning component has a second engagement part, a pivoting part and a pressing part, the pivoting part is connected between the second engagement part and the pressing part and pivoted to the base, the second elastic component is connected between the positioning component and the main body, the second engagement part is adapted to be engaged with the first engagement part by the elastic force of the second elastic component, and the pressing part is adapted to receive a force and resist the elastic force of the second elastic component to drive the pivoting part to pivot relatively to the base, such that the second engagement part moves away from the first engagement part.

9. The holding structure according to claim 1, wherein the base has a containing concave, and a bottom of the electronic device is adapted to be contained in the containing concave.

10. The holding structure according to claim 1 wherein the base has a connection port and is adapted to be electrically connected to an external power supply, and when the electronic device leans against the base, the electronic device is connected to the connection port and receives electricity from the external power supply through the connection port.

* * * * *